(12) United States Patent
Li (10) Patent No.: US 10,426,108 B2
(45) Date of Patent: Oct. 1, 2019

(54) ASSEMBLY WELL IRRIGATION SYSTEM FOR ENVIRONMENTALLY FRIENDLY WATER CONSERVATION

(71) Applicant: Yi-Hsi Li, Kaohsiung (TW)

(72) Inventor: Yi-Hsi Li, Kaohsiung (TW)

( * ) Notice: Subject to any disclaimer, the term of this patent is extended or adjusted under 35 U.S.C. 154(b) by 364 days.

(21) Appl. No.: 15/371,460

(22) Filed: Dec. 7, 2016

(65) Prior Publication Data

US 2018/0153112 A1  Jun. 7, 2018

(51) Int. Cl.
*A01G 27/00* (2006.01)
*A01G 29/00* (2006.01)

(52) U.S. Cl.
CPC ......... *A01G 27/005* (2013.01); *A01G 27/003* (2013.01); *A01G 29/00* (2013.01)

(58) Field of Classification Search
CPC .. A01G 27/005; A01G 27/003; A01G 27/006; A01G 2025/006; A01G 25/06; A01G 29/00
See application file for complete search history.

(56) References Cited

U.S. PATENT DOCUMENTS

| | | | | |
|---|---|---|---|---|
| 5,542,605 A * | 8/1996 | Campau | ............... | A01G 27/001 222/187 |
| 5,836,106 A * | 11/1998 | Alex | ............... | A01G 27/005 47/48.5 |
| 2002/0020111 A1 * | 2/2002 | Rosenberg | ........... | A01G 27/006 47/48.5 |
| 2007/0267515 A1 * | 11/2007 | Sargent | ............... | A01G 27/003 239/63 |
| 2008/0017728 A1 * | 1/2008 | Wu | ............... | A01G 27/006 239/44 |
| 2014/0075837 A1 * | 3/2014 | Little | ............... | A01G 25/02 47/48.5 |
| 2016/0174478 A1 * | 6/2016 | Pinto | ............... | A01G 27/008 47/48.5 |

* cited by examiner

*Primary Examiner* — Jessica B Wong
(74) *Attorney, Agent, or Firm* — Rosenberg, Klein & Lee (57) ABSTRACT

An assembly well irrigation system for environmentally friendly water conservation includes: at least one well, having a ventilation tube inserted into the top of the well, an absorbent element covered onto the bottom and outer wall of the ventilation tube and filled up in an opening between the top of the well and the ventilation tube, and a float contained in the ventilation tube; and at least one water supply bottle, having a cover installed to the opening of the water supply bottle, and the cover having a fixed tube passing to the cover and a penetrating hole formed on the cover, and the penetrating hole having a movable tube capable of moving up and down for adjustment, and the water supply bottle being inverted, such that the cover is installed to the well, and the fixed tube, the movable tube and the ventilation tube are situated in the well.

9 Claims, 11 Drawing Sheets

FIG.11 excellent # ASSEMBLY WELL IRRIGATION SYSTEM FOR ENVIRONMENTALLY FRIENDLY WATER CONSERVATION

FIELD OF INVENTION

The present invention relates to an assembly well irrigation system for environmentally friendly water conservation, in particular to the irrigation system having a water level controller for adjusting the position of a movable tube of a float or a water supply bottle to control the water level of a well; and the well has a ventilation tube and an absorbent element covered and disposed on the bottom and outer wall of the ventilation tube, and the absorbent element may be a cotton silver with both ends split open and protruded from the well for improving the efficiency of water penetration, and the absorbent element is filled up at an opening formed between the top of the well and the ventilation tube to prevent soil from entering into the well and hardening the water to disable the well or reduce the penetration effect. Without requiring any electric power, the seepage flow of the well for irrigating soil can be controlled and supplied according to the requirements of the plant, an automatic irrigation for all weathers can be achieved, and water penetrates through the outside of the well to irrigate a large-area planted land, one or more potted plants, so as to achieve the water-saving and power-saving effects.

BACKGROUND OF INVENTION

1. Description of the Related Art

Planting refers to the cultivation of plants by the processes including fertilization, irrigation, weeding, etc. As to irrigation, a common irrigation method is to irrigate soil manually and directly by water contained in a container, or to install a sprinkler or an irrigation system directly to automatically or manually irrigate the plants through the connected water supply system. However, the irrigation by water contained in a container cannot control the water supply accurately. Since the water quantity required by the growth of plants varies, therefore a plant may wilt and die if the plant is not irrigated according to the growing characteristics of the plant, or too much or less water is irrigated. If the irrigated area is too broad, or the quantity of potted plants is too large, much manpower, time and cost will be consumed. As to the irrigation by a sprinkler or an irrigation system, the cost for the production processes is too high, and much electric power is required, and such irrigation is just intended for the irrigation of a large-area planted land and it is not applicable for indoor or outdoor potted plants, particularly for the home environment. When such irrigation is applied to potted plants, water may be dispersed outside the potted plants, water resources may be wasted, and the environment may be affected adversely, and mosquitoes or insects may breed.

As disclosed in R.O.C. Pat. No. M479004 entitled "Automatic water supply pot with a water saving function" and its counterpart P.R.C. Pat. Publication No. CN 203788787 U and granted to the inventor of the present invention, this patented technology mainly inverts a water supply bottle and sends water from a well to different potted plants to achieve the effect of cultivating a large area. However, the water quantity contained in the water supply bottle in accordance with this patent is limited. For the cultivation for a large area or a multiple of potted plants, the water consumption is too quick and water cannot be supplied automatically for a long time, so that users have to keep resupplying water into the water supply bottle. Furthermore, it is necessary to rotate and adjust the position of a holding tube to adjust the position of air holes in order to adjust the water level, and the process for the adjustment is very inconvenient. In addition, the volume of its water storage box is too large, and such irrigation method is suitable for various different planting containers, and water is inputted into the water storage box through an overflow hole, and the overflow hole has a smaller cross-sectional area, so that the soil entering into the overflow hole will be hardened, and the efficiency of permeating water into the soil will be affected. In summation, this irrigation method still consumes much manpower, time, and cost and brings much inconvenience to users.

In view of the aforementioned drawbacks, the inventor of the present invention based on years of experience in the related industry to conduct extensive research and experiment, and finally developed an irrigation system in accordance with the present invention to overcome the drawbacks of the prior art.

2. Summary of the Invention

Therefore, it is a primary objective of the present invention to overcome the drawbacks of the conventional irrigation methods or systems. As to the irrigation by water contained in the container, the water quantity cannot be controlled easily, and thus the plants will wilt and die easily, and it consumes much manpower, time and cost for the irrigation of a large area planted land and more potted plants. As to the irrigation by the sprinkler or irrigation system, the production cost is very high, and water resources are wasted, so that such irrigation method is not applicable for indoor or outdoor potted plants. The water quantity contained by the water supply bottle of R.O.C. Pat. No. M479004 is very limited and thus such irrigation method is not applicable for the cultivation of large area or multiple potted plants and it is inconvenience to adjust the water level, and cannot not be used for various different planting containers and the efficiency of permeating water into soil is affected.

To achieve the aforementioned and other objectives, the present invention provides an assembly well irrigation system for environmentally friendly water conservation, comprising: at least one well, having a ventilation tube inserted into the top of the well, an absorbent element covered onto the bottom and outer wall of the ventilation tube and filled up in an opening formed between the top of the well and the ventilation tube, and a float contained in the ventilation tube; and at least one water supply bottle, having a cover installed to the opening of the water supply bottle, and the cover having a fixed tube passing to the cover and a penetrating hole formed on the cover, and the penetrating hole having a movable tube capable of moving up and down for an adjustment, and the water supply bottle being inverted, such that the cover is installed to the well, and the fixed tube, the movable tube and the ventilation tube are situated in the well.

In the aforementioned assembly well irrigation system for environmentally friendly water conservation, the bottom of the well is enclosed to form a tip, and at least one waterproof ring is installed on a side of the top of the tip, and the tip of the well is partially cut, so that the well is in a tubular shape.

In the aforementioned assembly well irrigation system for environmentally friendly water conservation, the irrigation system further comprises a plurality of water guiding holes formed on a side of the ventilation tube.

In the aforementioned assembly well irrigation system for environmentally friendly water conservation, the top of the well further has a connecting element, and the connecting element has a through hole and a connect hole, and the ventilation tube is inserted through the through hole into the well, and a holder is installed to the top of the connect hole, and the water supply bottle is inverted into the holder, and the fixed tube and the movable tube are passed into the well through the connect hole.

In the aforementioned assembly well irrigation system for environmentally friendly water conservation, the irrigation system further comprises a hook disposed on a side of the connecting element.

In the aforementioned assembly well irrigation system for environmentally friendly water conservation, the well is inserted into a planting container.

In the aforementioned assembly well irrigation system for environmentally friendly water conservation, the irrigation system further comprises a water level controller, and the water level controller having a water inlet valve coupled to a water inlet pipe, and the water inlet pipe being coupled to a holding tube, and the bottom of the holding tube being communicated with at least one of the wells, and the holding tube containing a float, and the float being coupled to a rod, and the rod being pivotally coupled to the water inlet valve by a pivot switch, so that when the float rises to a specific height, the rod drives the pivot switch to pivot and press to shut the water inlet valve, and when the float is lower than the height, the water inlet valve is opened; and the water inlet valve is provided for connecting a water supply device.

In the aforementioned assembly well irrigation system for environmentally friendly water conservation, the irrigation system further comprises at least one planting container, and the wells are installed in the planting container, and a water guiding tube is installed transversely between the wells and communicated with one another.

In the aforementioned assembly well irrigation system for environmentally friendly water conservation, the irrigation system further comprises a rack, and the rack having a cross bar and a suspending rod substantially parallel to the rack, and both ends of the cross bar having a connect hole separately, and both ends of the suspending rod having a screw hole separately; and the suspending rod having a plurality of hooks, and the planting container having a hanging hole, and the hanging hole being provided for hanging the hook; and two screws, passed and installed into the connect hole and secured into the screw hole.

In the aforementioned assembly well irrigation system for environmentally friendly water conservation, the absorbent element is substantially a linear cotton silver, and both ends of the absorbent element are protruded from the well, and both ends of the absorbent element are split open.

From the description above, the present invention obviously has the following advantages and effects:

1. The present invention buries the well into soil, so that when the water level does not exceed the height of the opening of the well, water is permeated by the absorbent element to move upward from the well to the soil outside the well to irrigate plants. With the ventilation tube inserted into the well in accordance with the present invention, air pressure is released from the ventilation tube, so that water can flow successfully between the wells, and the absorbent element is covered onto the bottom and outer wall of the ventilation tube and filled up in the opening between the top of the well and the ventilation tube, so that soil will not enter into the well easily, so as to prevent the soil in the well from being hardened or affecting the penetrating force of water into the soil, and the ends of the absorbent elements are protruded from the well and split open, so that the water in the well can be permeated through the absorbent element to the external soil, so as to achieve a good irrigation effect. The absorbent element is preferably a cotton silver capable of lowering the manufacturing and replacement costs. When the cotton silver is insufficient for use, the ventilation tube may be drawn out directly and replaced, so that the present invention also improves the convenience of replacing the cotton silver.

2. The water supplied to the well in accordance with the present invention is accomplished by a water supply bottle and/or a water supply device. As to the water supply bottle, the water supply bottle is inverted and installed to the cover (which is installed to the well) after the water supply water is filled up with water, and the fixed tube and the movable tube are situated in the well, and the water contained in the water supply bottle is inputted from the fixed tube into the well and flows into the well. By the principle of a communicating pipe, the water levels of all wells are the same and rise synchronously. When the water level rises to the bottom of the movable tube, the water level will not rise anymore due to the air pressure inside the movable tube and the water supply bottle, so that the water level is limited to a part of the bottom of the movable tube bottom, and the water level of the well is situated at the position of the bottom of the movable tube, and the float inside the ventilation tube is provided for indicating the height of the water level in the well. In the present invention, the position of the movable tube may be adjusted to control the water level. In other words, the seepage flow for the irrigation can be controlled according to the growing characteristics of the plants. In addition, the quantity of absorbent elements can be used to control the seepage flow for irrigation through the capillary effect. As to the water supplied by the water supply device, the water inlet valve of the water level controller is connected to the water supply device. Based on the principle of a communicating pipe, the water levels of the holding tube and the well are the same. At the starting status, the water level has not reached a specific height, so that the water inlet valve remains opened, and water keeps pouring into the holding tube and the well. Until the float rises to a certain height, the rod pivotally turns the pivot switch to push and shut the water inlet valve, so as to control and maintain the height of the water level. Obviously, the present invention can perform the irrigation for a long time and save time, labor, and cost.

3. The present invention is applicable for a single planting container, a plurality of planting containers, or a large-area planted land. For the application in a single planting container, the tip of the well allows the well to be inserted into the soil directly, and the water supply bottle is installed, so that water can be supplied by the water supply bottle for irrigation. For the application in a plurality of planting containers, the tip is cut and removed, and a well is installed to each planting container and connected to the water guiding tube, and the well situated at the starting end is connected to the water supply bottle, and the well situated at the ending end is connected to the water level controller. For the application in a large-area planted land, the well is buried into the soil of the planted land directly. As described above, the well situated at the starting end is connected to the water supply bottle, and the well situated at the ending end is connected to the water level controller. For the application in the plurality of planting containers and the large-area planted land, both water supply bottle and water level controller are used for supplying water for the irrigation. Obviously, the present invention is applicable for various different cultivation situations and capable of irrigating the plants automatically. In addition, an unlimited quantity of irrigation systems can be connected in series to provide a broader scope of applicability without requiring any electric power, and the present invention also saves cost, irrigation time and labor cost, and achieves the effects of protecting environment, saving water and energy, and lowering the labor cost.

DESCRIPTION OF THE PREFERRED EMBODIMENTS

The above and other objects, features and advantages of this disclosure will become apparent from the following detailed description taken with the accompanying drawings.

Figure 2:
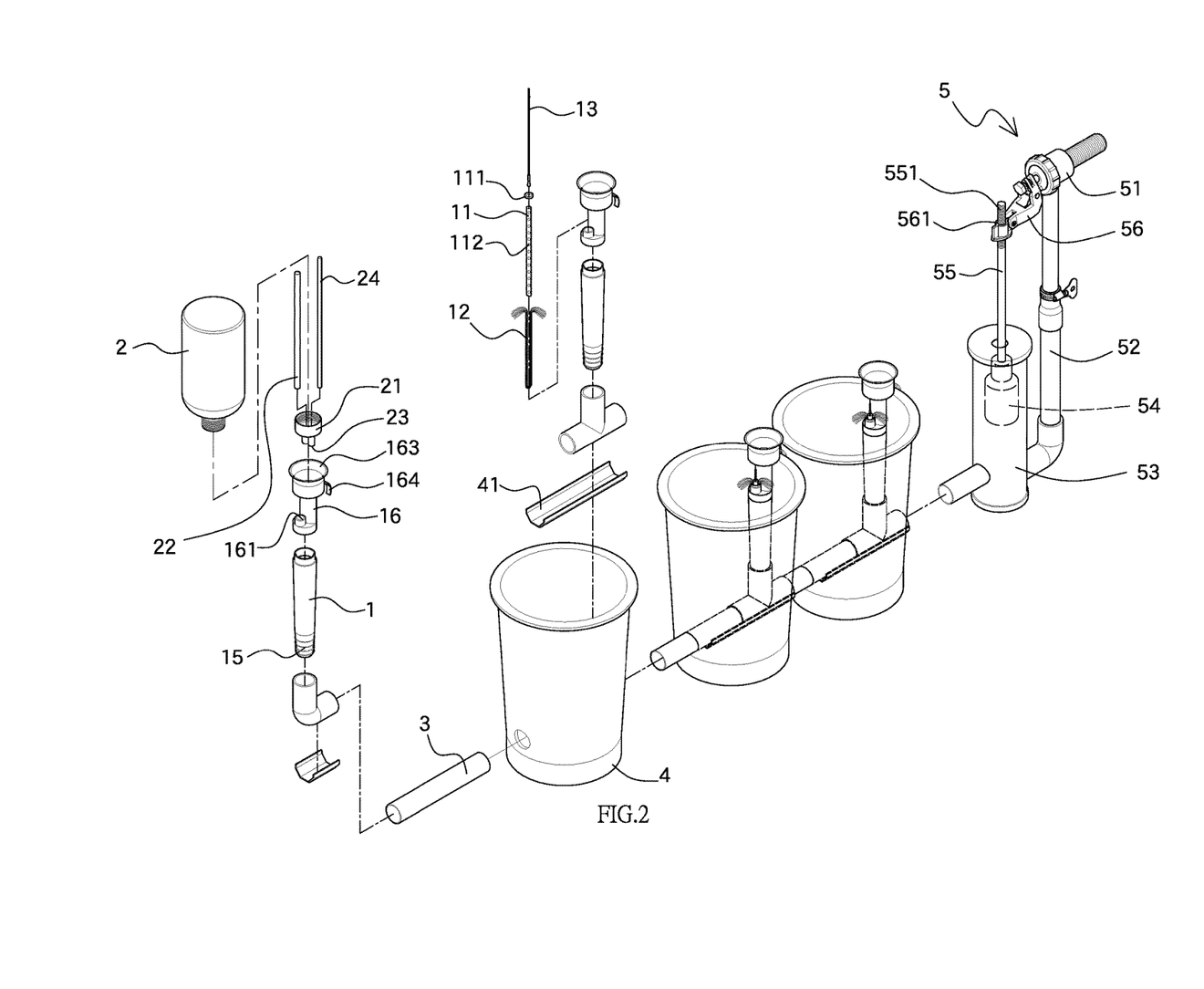
FIG. 2 is an exploded view of the first embodiment of the present invention.

With reference to FIGS. 1 to 5 for an assembly well irrigation system for environmentally friendly water conservation in accordance with the first embodiment of the present invention, the assembly well irrigation system comprises the following parts:

As shown in FIG. 2, the irrigation system comprises at least one well 1 with a ventilation tube 11 inserted into the well 1, and an absorbent element 12 covered onto the bottom and outer wall of the ventilation tube 11 and filled up in an opening between the top of the well 1 and the ventilation tube 11. To save the absorbent element 12 and its installation cost, the absorbent elements 12 are installed linearly, and both ends of the absorbent element 12 are protruded from the well 1. To further improve the penetration force of the absorbent element 12, both ends of the absorbent element 12 are split to increase the contact area. Preferably, the absorbent element 12 is cotton silver, and the quantity of absorbent elements 12 used depends on the seepage flow required for the irrigation. To facilitate the fixation of the absorbent elements 12, a positioning element 111 is provided for positioning the absorbent elements 12 on the wall of the ventilation tube 11. To make it easy to remove the ventilation tube 11, the absorbent elements 12 can be removed at the same time, so as to improve the convenience of operating the irrigation system of the present invention. To improve the water absorbability and the efficiency of irrigation by the capillary effect, the ventilation tube 11 has a plurality of water guiding holes 112 formed on a side of the ventilation tube 11, so that water can be outputted smoothly.

The ventilation tube 11 contains a float 13 to facilitate users to observe the water level in the well 1.

The irrigation system also comprises at least one water supply bottle 2, a cover 21 installed to an opening of the water supply bottle 2, and the cover 21 has a fixed tube 22 and a penetrating hole 23, and the penetrating hole 23 has a movable tube 24 which can be movably adjusted up and down, and the water supply bottle 2 is inverted to install the cover 21 to a well 1, and the ventilation tube 11, the fixed tube 22 and the movable tube 24 are situated in the well 1. The bottom of the well 1 is communicated with at least one of the wells 1, and the height of the movable tube 24 in the well 1 is used to control and maintain the water level of the well 1 by the principle of a communicating pipe.

To position the water supply bottle 2, the ventilation tube 11, the fixed tube 22 and the movable tube 24 easily and reduce their occupied space, a connecting element 16 is installed to the top of the well 1, and the connecting element 16 has a through hole 161 and a connect hole 162. The ventilation tube 11 is inserted into the well 1 through the through hole 161, and a holder 163 is installed to the top of the connect hole 162, and the water supply bottle 2 is inverted into the holder 163, and the fixed tube 22 and the movable tube 24 are passed into the well 1 through the connect hole 162.

Figure 6:
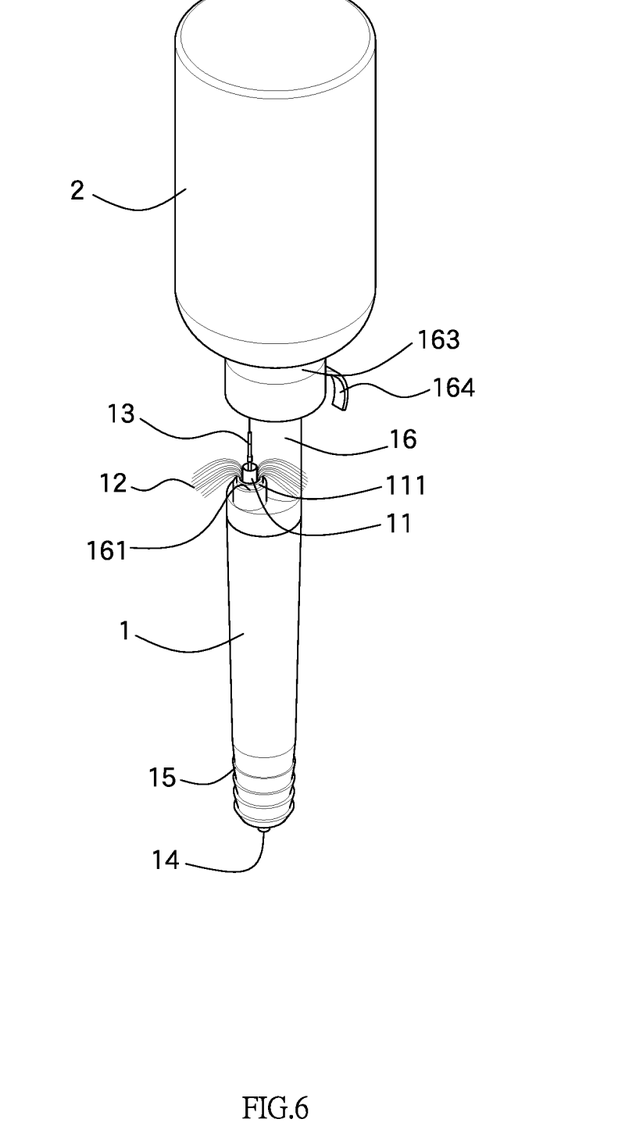
FIG. 6 is a perspective view of the present invention.
Figure 7:
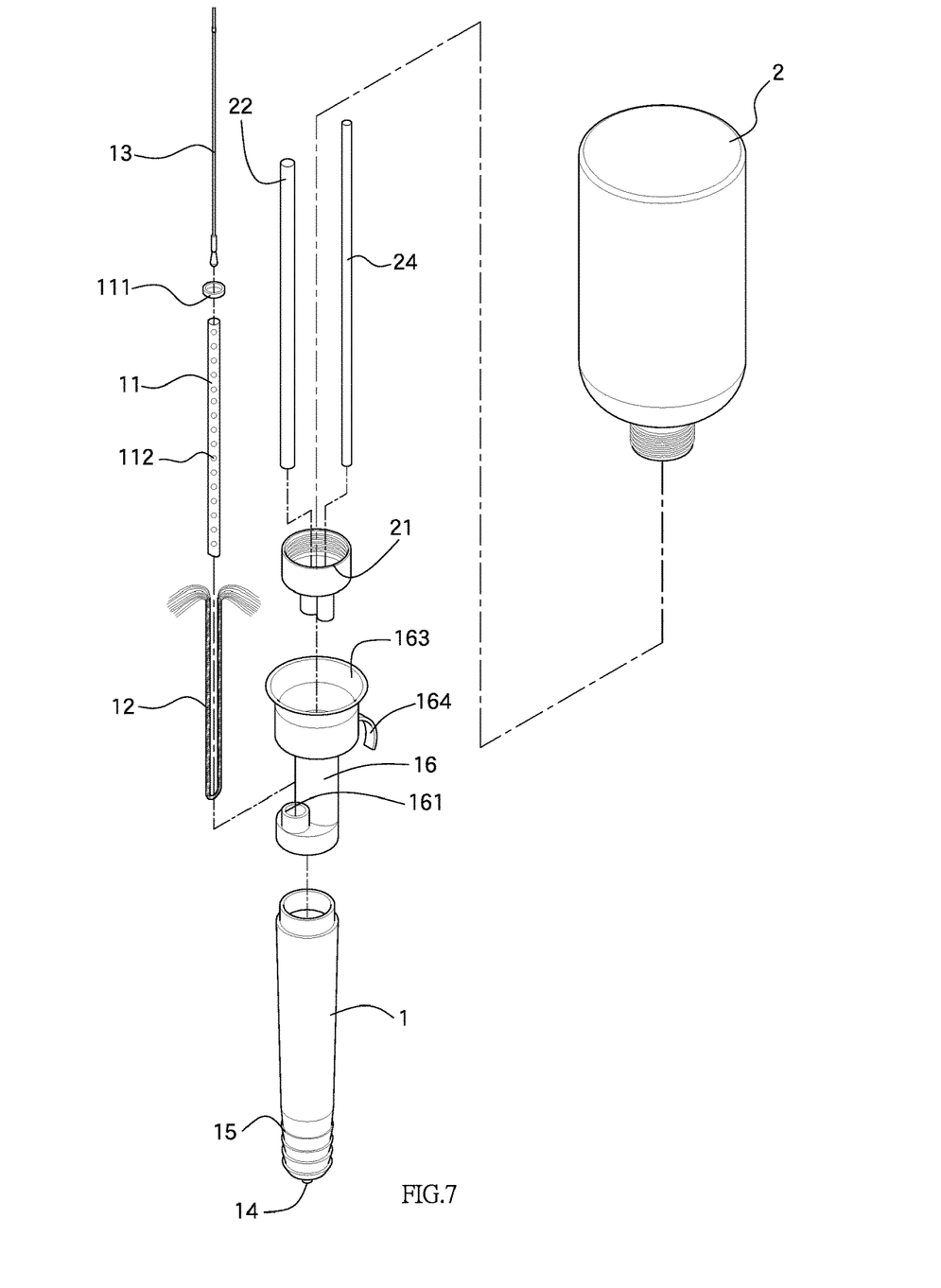
FIG. 7 is an exploded view of the present invention.

With reference to FIGS. 6 and 7, the bottom of the well 1 is enclosed to form a tip 14, and at least one waterproof ring 15 is installed onto a side of the top of the tip 14. Since the first embodiment has a plurality of wells 1, therefore it is necessary to communicate the wells 1 with one another, and the tip 14 of the well 1 is partially cut so that the well 1 is formed into a tubular shape, and a water guiding tube 3 is transversely installed between the wells 1 to communicate the wells 1 with one another. The water guiding tube 3 is a T-shaped tube, and the wells 1 can be connected to the water guiding tube 3 by the waterproof ring 15 to achieve a waterproof effect.

Figure 1:
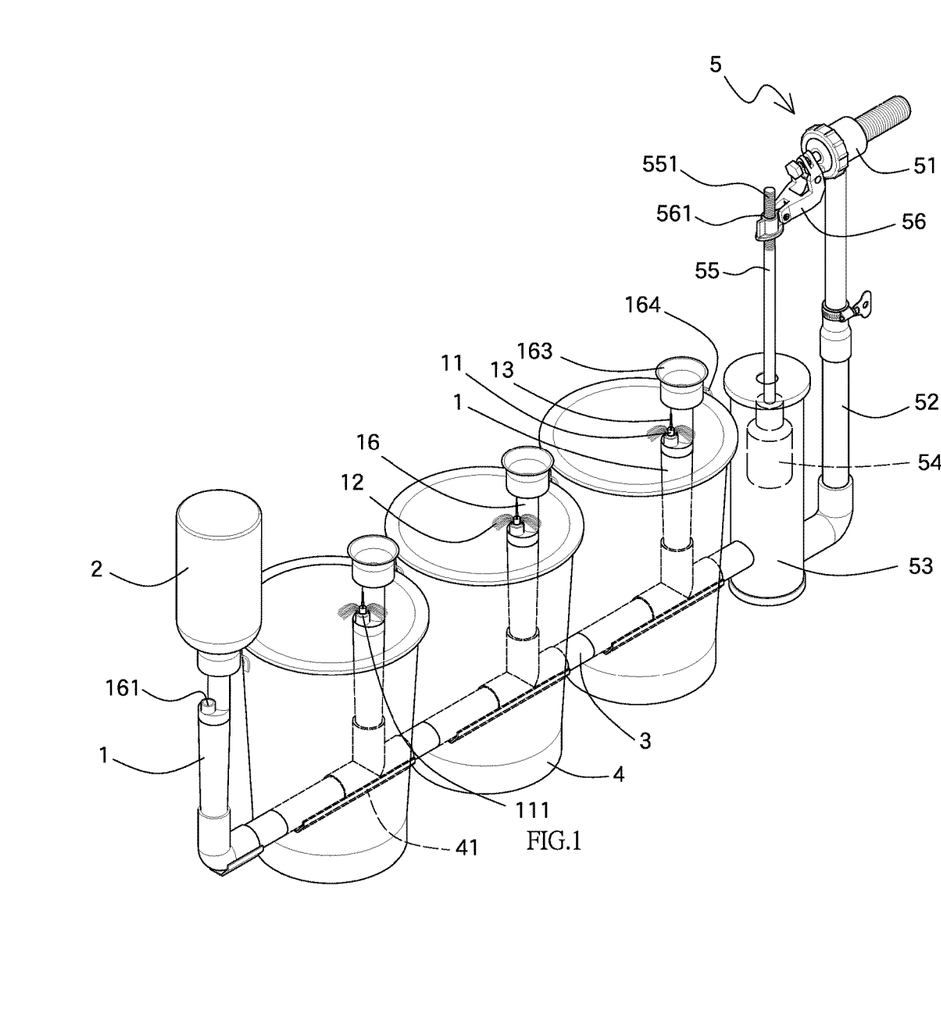
FIG. 1 is a schematic view of a first embodiment of the present invention.

In the first embodiment, the irrigation system is applied to a plurality of planting containers 4, so that the wells 1 are installed in the planting containers 4 respectively. To secure the wells 1, a hook 164 is installed to a side of the connecting element 16 and hanged to the top edge of the planting container 4. To securely fix the well 1 into the planting container 4 and facilitate the installation of the water guiding tube 3, the water guiding tube 3 is passed and installed to the planting container 4, and a fastener 41 is disposed at the bottom of the planting container 4 and provided for fixing the water guiding tube 3 into position. As shown in FIGS. 1 and 2, the fastener 41 and the water guiding tube 3 are latched and fixed with one another.

The irrigation system further comprises a water level controller 5, and the water level controller 5 has a water inlet valve 51, and the water inlet valve 51 is connected to a water inlet pipe 52, and the water inlet pipe 52 is connected to a holding tube 53, and the water guiding tube 3 transversely installed to the bottom of the holding tube 53 is communicated with at least one of the wells 1, and the holding tube 53 contains a float 54, and the float 54 is connected to a rod 55, and the rod 55 is pivotally coupled to the water inlet valve 51 by a pivot switch 56, so that when the float 54 rises to a specific height, the rod 55 pivotally turns the pivot switch 56 and pushes to shut the water inlet valve 51. When the float 54 is lower than the height, the water inlet valve 51 is opened. The water inlet valve 51 is coupled to a water supply device 6, wherein the water supply device 6 is a water faucet.

Figure 3:
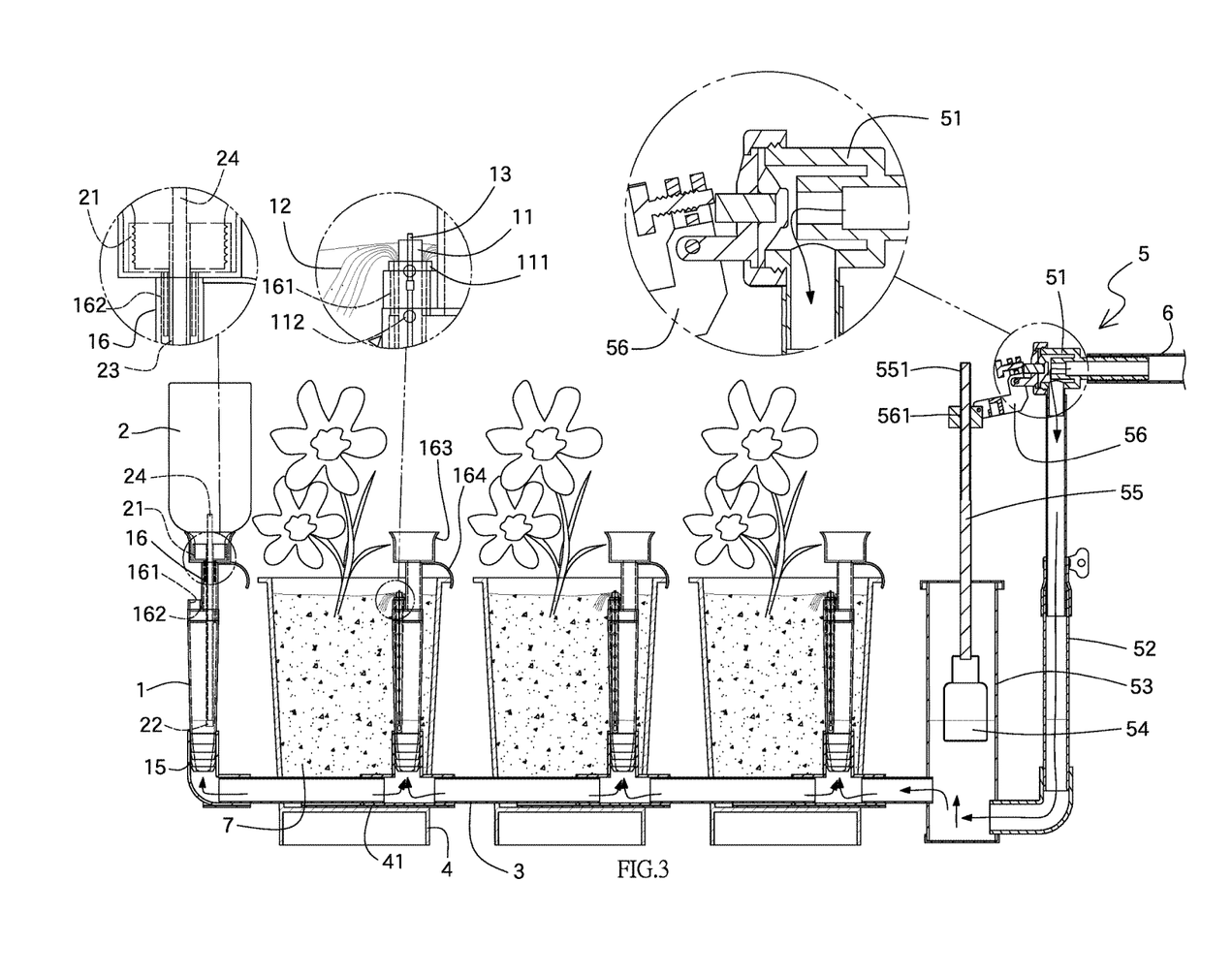
FIG. 3 is a sectional view of the first embodiment of the present invention as well as a schematic view showing a using status of a water supply bottle and a water level controller while supplying water.

In the first embodiment as shown in FIG. 3, the wells 1 are fixed to the planting containers 4 respectively, and a soil 7 is put into the planting container 4, and the well 1 is buried with the soil 7 but not up to a position that buries the ventilation tube 11. In the well 1 situated in the planting container 4, the water supply bottle 2 and its fixed tube 22 and movable tube 24 are moved, and the connect hole 162 and the holder 163 are sealed. For example, a seal is used sealing and protecting dust or foreign substances from entering into the well 1. In addition, it is necessary to install one of the wells 1 outside the planting container 4, and the ventilation tube 11 and absorbent element 12 of the well 1 situated outside the planting container 4 must be removed, and its through hole 161 is sealed to prevent dust and foreign substances from entering into the well 1. The well 1 situated inside the planting container 4 prevents the soil 7 from entering the well 1 by the installation of the absorbent element 12 and also prevents the soil 7 from being hardened or affecting the water permeability. The water supply bottle 2 is filled up with water, and then inverted, so that the fixed tube 22 and the movable tube 24 are situated in the well 1, and the water supply device 6 is turned on.

Figure 4:
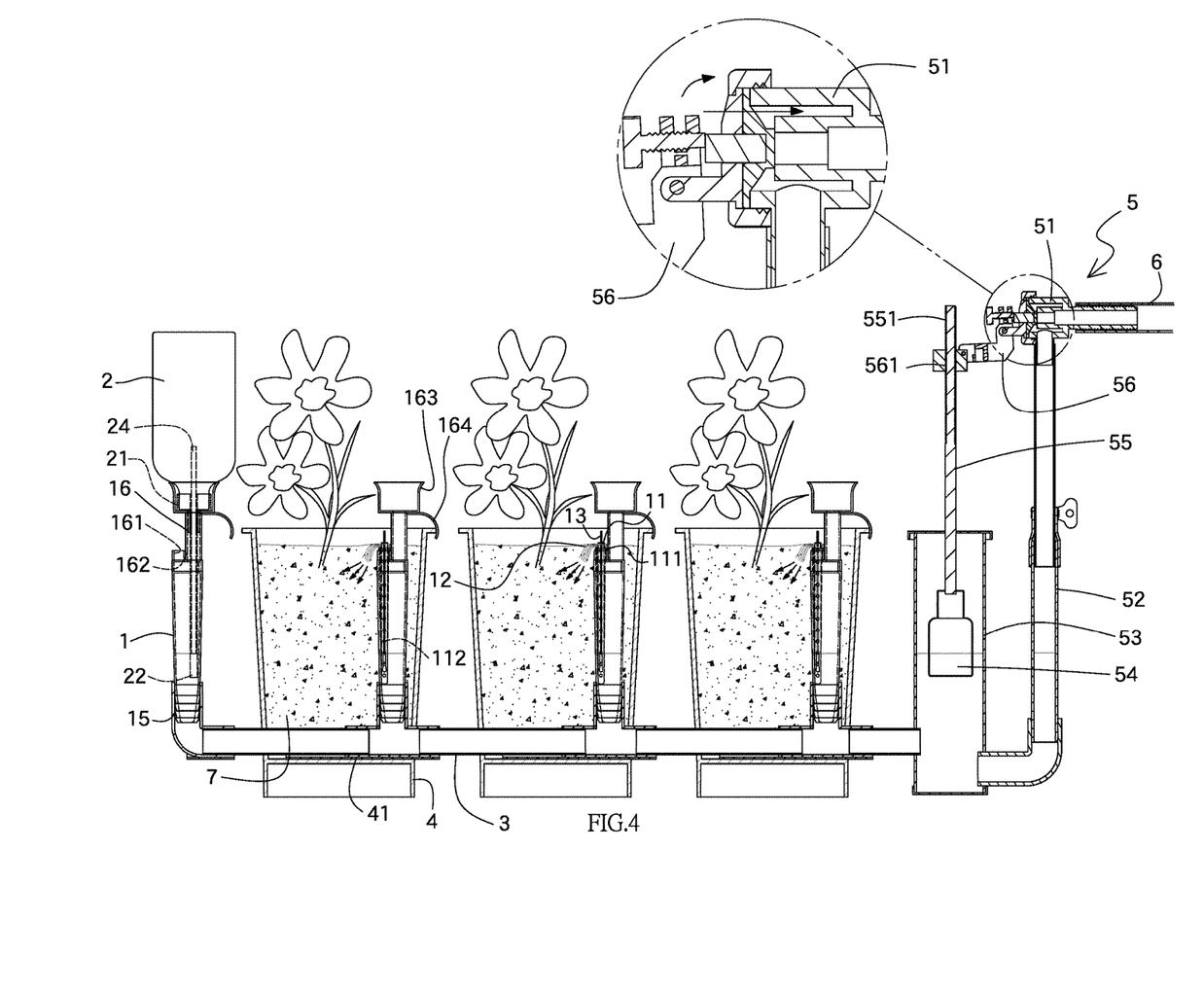
FIG. 4 is a cross-sectional view of the first embodiment of the present invention and a schematic view showing a using status of a well at a lower water level.

With reference to FIG. 3 for the water supply of the water supply bottle 2, when the water in the water supply bottle 2 is outputted from the fixed tube 22 to the well 1, and passed through the water guiding tube 3 to flow to the well 1 and the holding tube 53, and the air in the well 1 is entered together with the water and discharged from the ventilation tube 11, so that the water can flow into the well 1. Due to the principle of a communicating pipe, the water levels of the well 1 and the holding tube 53 are almost the same, so that the water levels of the well 1 and the holding tube 53 rise synchronously. Until the water levels rise to a position of the movable tube 24 situated at an end of the well 1 as shown in FIG. 4, the water pressure in the water supply bottle 2 is greater than the water pressure of the well 1 and the holding tube 53 and insufficient to overcome the air pressure in the movable tube 24 and the water supply bottle 2, so that the water supply stops. Therefore, the water levels of the well 1 and the holding tube 53 can be controlled to adjust the water level. The water supply bottle 2 may be removed, and the height of the movable tube 24 is adjusted to achieve the effect of controlling the water level.

As to the water supply controlled by the water level controller 5, the water levels of the well 1 and the holding tube 53 are almost the same due to the principle of a communicating pipe (as illustrated previously in FIG. 3), and when the height of the water level in the holding tube 53 is insufficient to drive the float 54 to rise to a specific height, the rod 55 cannot pivotally turn the pivot switch 56, so that the water inlet valve 51 is situated at the open state and keeps inputting water. In FIG. 4, when the float 54 rises to a specific height, the float 54 pushes the rod 55 to pivotally turn the pivot switch 56 and pushes to shut the water inlet valve 51, so as to achieve the effect of controlling the water level. When it is necessary to adjust the water level, the rod 55 may be rotated to adjust the height of the rod 55 and the float 54 since the pivot switch 56 has a thread 561, and the rod 55 has a thread 551 formed at the pivot switch 56 and configured to be corresponsive to the thread 561 for the rotation.

Figure 5:
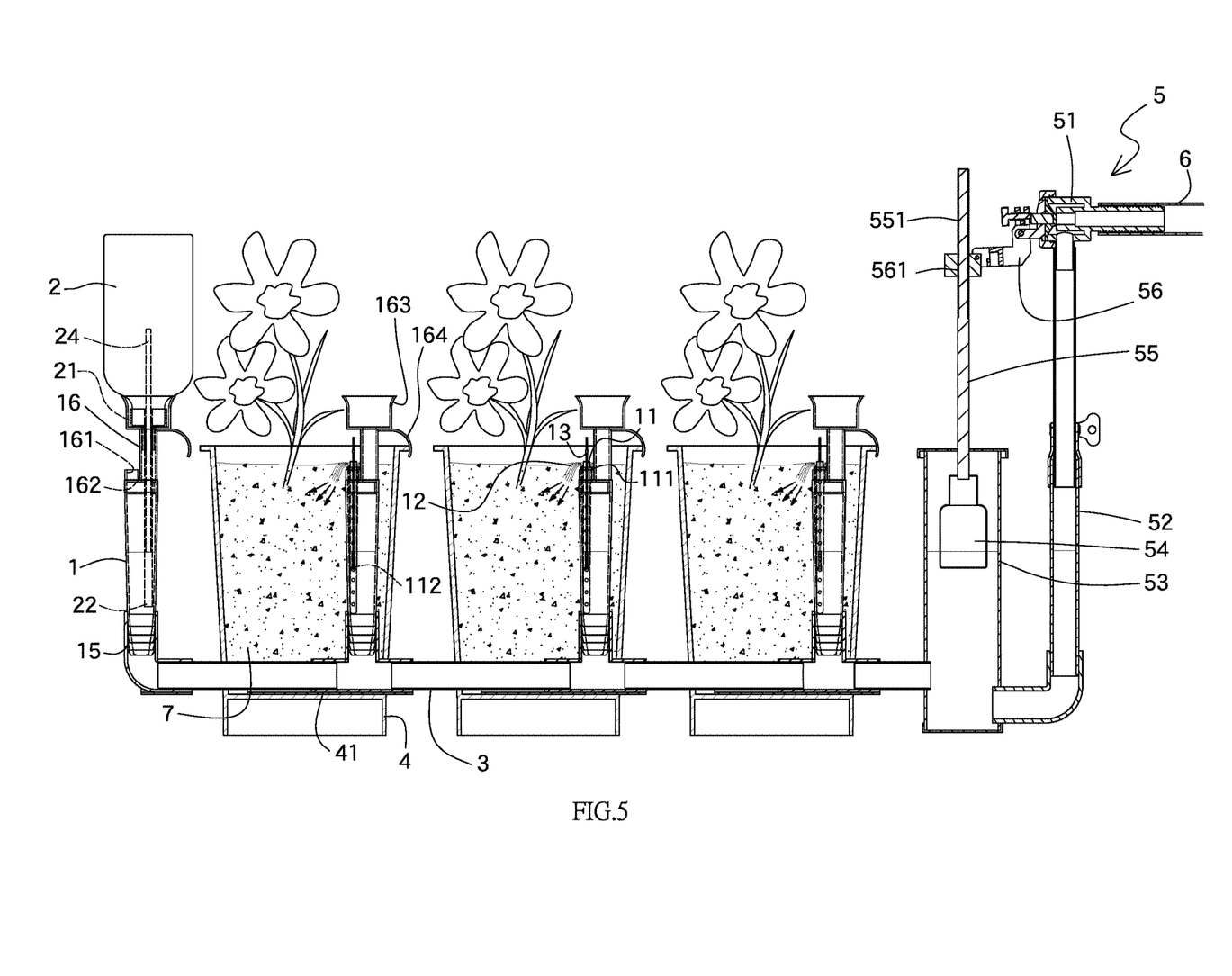
FIG. 5 is a cross-sectional view of the first embodiment of the present invention as well as a schematic view showing a using status of a well at a higher water level.

As to the irrigation of the soil 7 by the well 1 as shown in FIG. 4, the aforementioned water level does not exceed the height of the opening of the well 1. After the water level of the well 1 is controlled by the water supply bottle 2 and the water level controller 5, water is used for irrigating the soil 7 outside the well 1 by the absorbent element 12 covered onto the ventilation tube 11. In FIG. 4, when the position of the water level is farther from the opening of the well 1, the seepage flow of water permeating to the outside soil 7 is lower, and thus such arrangement is suitable for the plant cultivation that requires less water. On the other hand, as shown in FIG. 5, when the water level is controlled to be closer to the opening of the well 1, the seepage flow of water permeating to the outside soil 7 is higher, and thus such arrangement is suitable for the plant cultivation that requires more water. To observe the water level of the well 1, a float 13 is installed in the ventilation tube 11, so that users may choose to adjust the water level when needed.

After the well 1 irrigates the soil 7, the water contained in the water supply bottle 2 is supplied continuously. In the meantime, if the water level of the holding tube 53 drops and the float 54 drops accordingly, the rod 55 will be unable to pivotally turn the pivot switch 56, so that the water inlet valve 51 will be in an open state to input water. Even if the water contained in the water supply bottle 2 is exhausted, the water supply device 6 still supplies water. Obviously, the present invention can control the water level according to the growing conditions of the plant and an all-weather automatic irrigation is achieved without requiring any electric power, cost, time, and labor.

When the absorbent element 12 is insufficient for the use, the soil 7 may be stripped and the ventilation tube 11 is removed in order to replace the absorbent element 12. Since the absorbent element 12 is a low-cost cotton silver, therefore the irrigation system of the invention does not cost too much.

Figure 8:
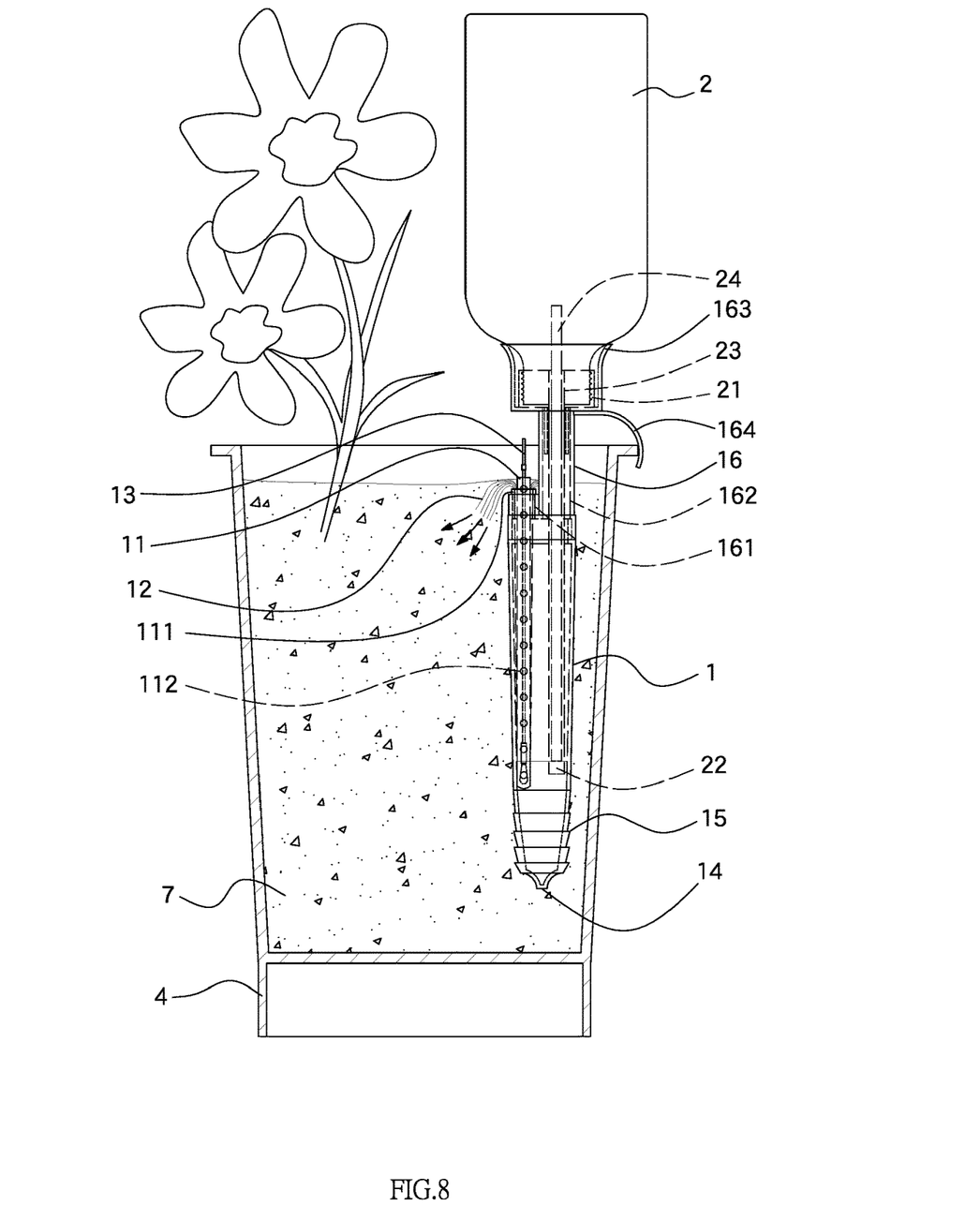
FIG. 8 is a cross-sectional view of a second embodiment of the present invention as well as a schematic view of a using status.

With reference to FIGS. 6 to 8 for the second embodiment of the present invention, the difference between the first and second embodiments resides on that the irrigation system of the second embodiment is installed to a single planting container 4, so that if a user just needs to irrigate a single planting container 4, the user may insert the well 1 into the soil inside the planting container 4 directly through the sealed tip 14, so that the irrigation system of the second embodiment may be applied directly to a single planting container 4 without requiring the removal of the soil of the planting container 4 or requiring the installation of the water level controller 5. When the water supply bottle 2 supplies water, the sealed tip 14 is formed at an end of the well 1, so that the water level rises in the well 1. With the aforementioned method and principle, the water level of the well 1 can be controlled, adjusted and observed for the irrigation of the soil 7. Therefore, the present invention may be applied more flexibly to improve the adaptability of the present invention. Other implementation methods of this embodiment are similar to the first embodiment, and thus will not be repeated.

Figure 9:
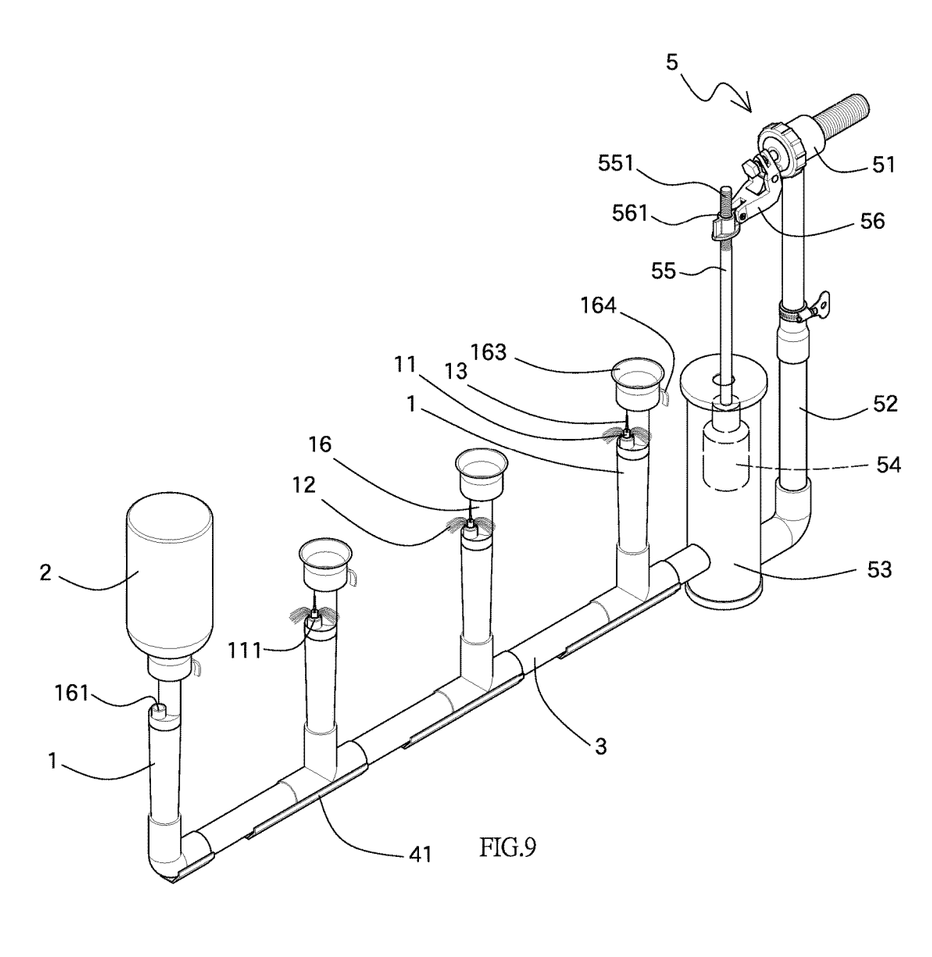
FIG. 9 is a perspective view of a third embodiment of the present invention.
Figure 10:
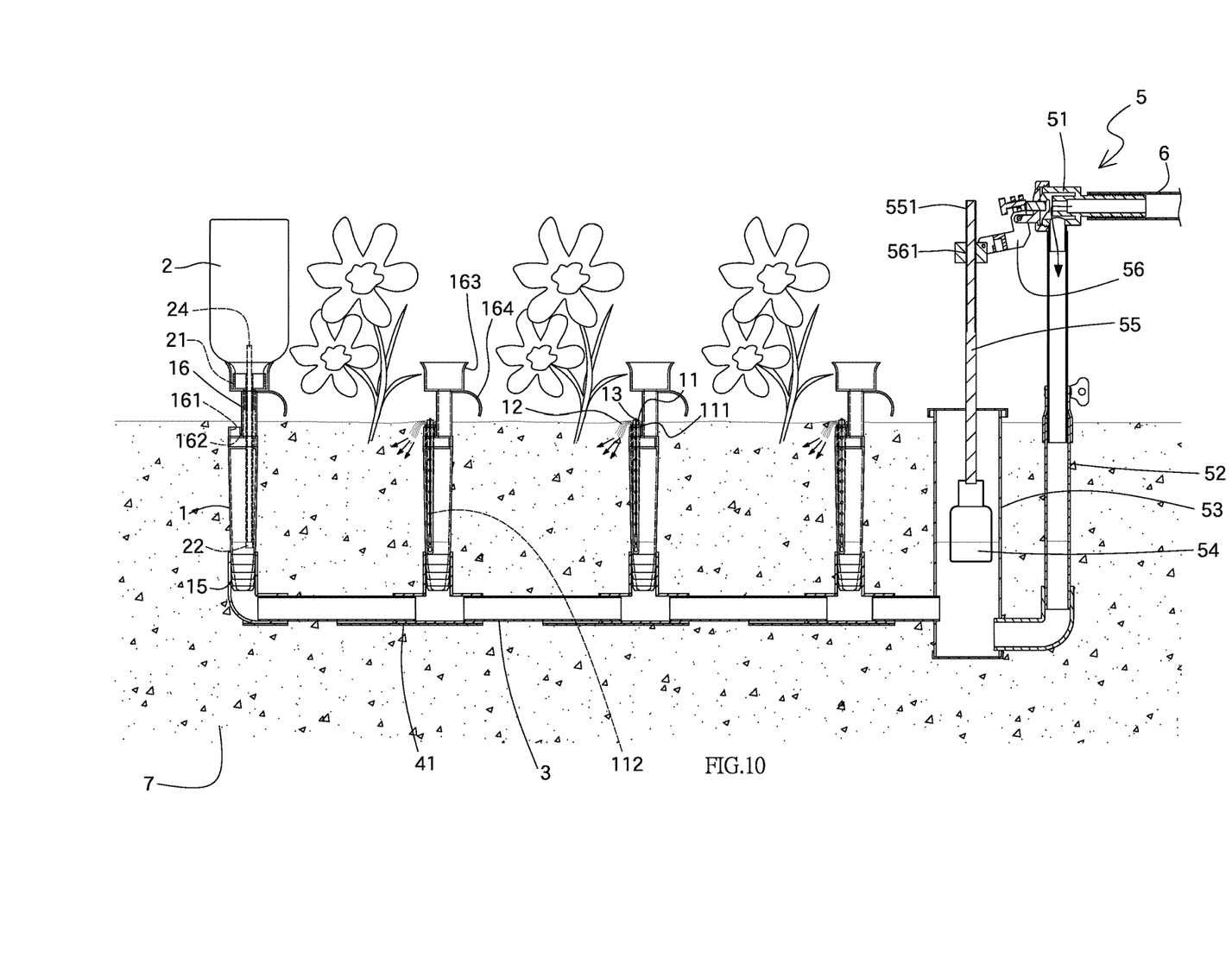
FIG. 10 is a cross-sectional view of the third embodiment of the present invention as well as a schematic view showing a using status.

With reference to FIGS. 9 and 10 for the third embodiment of the present invention, the difference between the first and third embodiments resides on that the irrigation system of the third embodiment is applied in a large-area planted land 8 without requiring the installation of the planting container 4, and a portion of the well 1 and the water level controller 5 are directly and synchronously buried into the soil 7, and the well 1 is installed as described above, and the tip 14 of the well 1 is removed to form a tubular shape. With the aforementioned arrangement, the water level can be controlled, adjusted, and observed, and the soil 7 can be irrigated. Other implementation methods of this embodiment are similar to the first embodiment, and thus will not be repeated.

Obviously, the present invention may be applied to one or more planting containers 4 as well as a large-area planted land 8, and thus the present invention has a broad scope of applicability.

Figure 11:
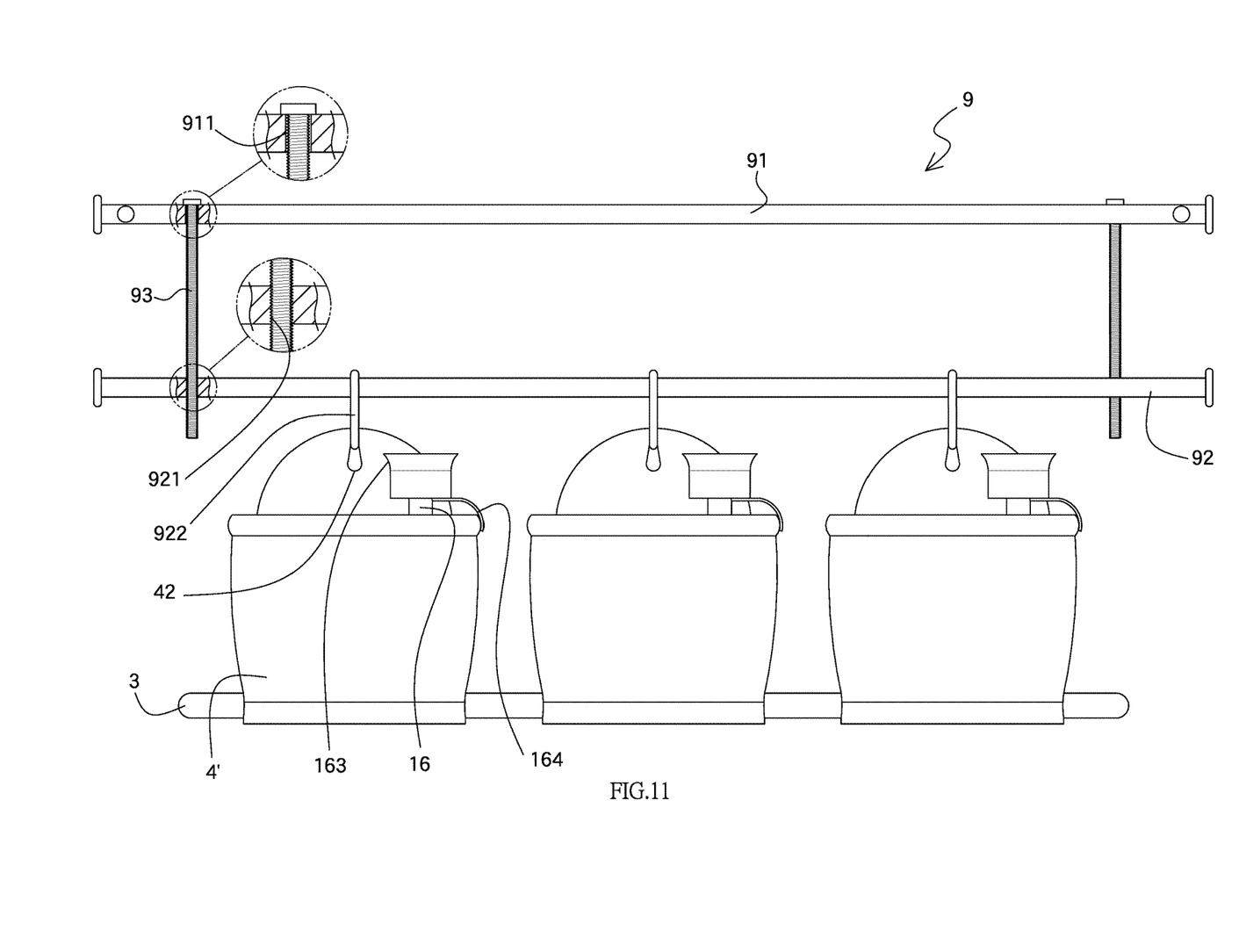
FIG. 11 is a front view of a fourth embodiment of the present invention.

With reference to FIG. 11 for the fourth embodiment of the present invention, the difference between the first and fourth embodiments resides on that the fourth embodiment further comprises a rack 9, and the rack 9 has a cross bar 91 and a suspending rod 92 substantially parallel to the rack 91, and both ends of the cross bar 91 have a connect hole 911 separately, and both ends of the suspending rod 92 have a screw hole 921 separately, and the suspending rod 92 has a plurality of hooks 922, and the planting container 4' of the fourth embodiment has a hanging hole 42 for hanging to the hook 922; and two screws 93 passed and secured into the connect hole 911 and installed into the screw hole 921. The rack 9 may be fixed onto a wall, and the screws 93 are rotated to adjust the depth of locking the screw 93 into the screw hole 921 in order to adjust the height and inclination of the suspending rod 92. To control the water level, the suspending rod 92 is adjusted to a horizontal status substantially parallel to the ground, and the water supply bottle 2 and the water level controller 5 are installed to indoor position inside a wall to achieve the all-weather irrigation effect and beautify the wall, so as to overcome the drawbacks of the conventional irrigation system which cannot irrigate plants on a wall easily.

In summation of the description above, the technical measure disclosed by the present invention definitely can overcome the drawbacks of the prior art and achieve the expected objectives and effects. The present invention complies with patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. An assembly well irrigation system for environmentally friendly water conservation, comprising:
   at least one well, having a ventilation tube inserted into the top of the well, an absorbent element covered onto the bottom and outer wall of the ventilation tube and filled up in an opening formed between the top of the well and the ventilation tube, and a float contained in the ventilation tube; and
   at least one water supply bottle, having a cover installed to the opening of the water supply bottle, and the cover having a fixed tube passing through the cover and a penetrating hole formed on the cover, and the penetrating hole having a movable tube capable of moving up and down for an adjustment, and the water supply bottle being inverted, such that the cover is installed to the well, and the fixed tube, the movable tube and the ventilation tube are situated in the well.

2. The assembly well irrigation system for environmentally friendly water conservation according to claim 1, wherein the bottom of the well is enclosed to form a tip, and at least one waterproof ring is installed on a side of the top of the tip, and the tip of the well is partially cut, so that the well is in a tubular shape.

3. The assembly well irrigation system for environmentally friendly water conservation according to claim 1, further comprising a plurality of water guiding holes formed on a side of the ventilation tube.

4. The assembly well irrigation system for environmentally friendly water conservation according to claim 1, wherein the top of the well further has a connecting element, and the connecting element has a through hole and a connect hole, and the ventilation tube is inserted through the through hole into the well, and a holder is installed to the top of the connect hole, and the water supply bottle is inverted into the holder, and the fixed tube and the movable tube are passed into the well through the connect hole.

5. The assembly well irrigation system for environmentally friendly water conservation according to claim 4, further comprising a hook disposed on a side of the connecting element.

6. The assembly well irrigation system for environmentally friendly water conservation according to claim 1, wherein the well is inserted into a planting container.

7. The assembly well irrigation system for environmentally friendly water conservation according to claim 1, further comprising a water level controller, and the water level controller having a water inlet valve coupled to a water inlet pipe, and the water inlet pipe being coupled to a holding tube, and the bottom of the holding tube being communicated with at least one of the wells, and the holding tube containing a float, and the float being coupled to a rod, and the rod being pivotally coupled to the water inlet valve by a pivot switch, so that when the float rises to a specific height, the rod drives the pivot switch to pivot and press to shut the water inlet valve, and when the float is lower than the height, the water inlet valve is opened; and the water inlet valve is provided for connecting a water supply device.

8. The assembly well irrigation system for environmentally friendly water conservation according to claim 1, further comprising at plurality of planting containers, and a plurality of wells, and the wells are installed in a corresponding planting container, and a water guiding tube is installed transversely between the wells and planting containers and communicated with one another.

9. The assembly well irrigation system for environmentally friendly water conservation according to claim 1, wherein the absorbent element is substantially a linear cotton silver, and both ends of the absorbent element are protruded from the well, and both ends of the absorbent element are split open.

* * * * *